US011271202B2

(12) United States Patent
Hong et al.

(10) Patent No.: US 11,271,202 B2
(45) Date of Patent: Mar. 8, 2022

(54) POSITIVE ACTIVE MATERIAL, METHOD OF MANUFACTURING THE SAME, AND POSITIVE ELECTRODE AND RECHARGEABLE LITHIUM BATTERY INCLUDING THE SAME

(71) Applicant: Samsung SDI Co., Ltd., Yongin-si (KR)

(72) Inventors: Soonkie Hong, Yongin-si (KR); Young-Ki Kim, Yongin-si (KR); Soonrewl Lee, Yongin-si (KR); Young-Hun Lee, Yongin-si (KR); Jiyeon Jang, Yongin-si (KR); Ickkyu Choi, Yongin-si (KR); Mingzi Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 216 days.

(21) Appl. No.: 16/547,422

(22) Filed: Aug. 21, 2019

(65) Prior Publication Data

US 2020/0067090 A1    Feb. 27, 2020

(30) Foreign Application Priority Data

Aug. 22, 2018  (KR) .................. 10-2018-0098249

(51) Int. Cl.
*H01M 4/525*        (2010.01)
*H01M 4/131*        (2010.01)
(Continued)

(52) U.S. Cl.
CPC ............ *H01M 4/525* (2013.01); *C01G 51/42* (2013.01); *H01M 4/131* (2013.01);
(Continued)

(58) Field of Classification Search
CPC ....... H01M 10/0525; H01M 2004/021; H01M 2004/028; H01M 4/131; H01M 4/525
See application file for complete search history.

(56) References Cited

U.S. PATENT DOCUMENTS 6,617,073 B1   9/2003  Matsumoto et al.
6,756,155 B1   6/2004  Kweon et al.
(Continued)

FOREIGN PATENT DOCUMENTS

CN        1298556 A      6/2001
CN      103733394 A      4/2014
(Continued)

OTHER PUBLICATIONS

Extended European Patent Search Report for corresponding European Patent Application No. 19193019.7, dated Jan. 30, 2020, 7 pages.
(Continued)

*Primary Examiner* — Carlos Barcena
(74) *Attorney, Agent, or Firm* — Lewis Roca Rothgerber Christie LLP (57) ABSTRACT

A positive active material for use in a positive electrode and a rechargeable lithium battery includes a lithium cobalt oxide including a secondary particle having an average particle diameter of about 15 μm to about 25 μm, wherein the secondary particle includes a plurality of primary particles having an average particle diameter of about 2 μm to about 10 μm, and the positive active material has a pellet density of greater than or equal to about 3.80 g/cm³. A method of manufacturing the positive active material includes heat-treating a cobalt-containing compound at a temperature of greater than or equal to about 900° C. to form a cobalt oxide comprising $Co_3O_4$ and CoO, and reacting the cobalt oxide with a lithium compound to prepare the lithium cobalt oxide.

17 Claims, 4 Drawing Sheets

(51) Int. Cl.
  *H01M 10/0525* (2010.01)
  *C01G 51/00* (2006.01)
  *H01M 4/02* (2006.01)

(52) U.S. Cl.
  CPC ..... *H01M 10/0525* (2013.01); *C01P 2002/72* (2013.01); *C01P 2002/88* (2013.01); *C01P 2004/61* (2013.01); *C01P 2006/10* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2005/0271576 A1 | 12/2005 | Awano et al. |
| 2006/0263690 A1 | 11/2006 | Suhara et al. |
| 2006/0263691 A1 | 11/2006 | Park et al. |
| 2010/0176352 A1 | 7/2010 | Chen et al. |
| 2012/0043500 A1 | 2/2012 | Xiang et al. |
| 2012/0183858 A1* | 7/2012 | Ellenwood ............ H01M 4/525 429/231.3 |
| 2014/0017567 A1 | 1/2014 | Oh et al. |
| 2015/0221945 A1 | 8/2015 | Kim et al. |
| 2017/0222223 A1 | 8/2017 | Hong et al. |
| 2018/0090753 A1 | 3/2018 | Li et al. |
| 2020/0203726 A1 | 6/2020 | Park et al. |

FOREIGN PATENT DOCUMENTS

| | | |
|---|---|---|
| CN | 104292903 A | 1/2015 |
| CN | 106099059 A | 11/2016 |
| CN | 107799764 A | 3/2018 |
| JP | 6-181062 A | 6/1994 |
| JP | 2004-119218 A | 4/2004 |
| JP | 2006-298669 A | 11/2006 |
| JP | 2006-310311 A | 11/2006 |
| JP | 2010-116302 A | 5/2010 |
| JP | 2013-501317 A | 1/2013 |
| KR | 2000-0061755 A | 10/2000 |
| KR | 10-2005-0030899 A | 3/2005 |
| KR | 10-2006-0112823 A | 11/2006 |
| KR | 10-2011-0107718 A | 10/2011 |
| KR | 10-2012-0126021 A | 11/2012 |
| KR | 10-2015-0050427 A | 5/2015 |
| KR | 10-2017-0090196 A | 8/2017 |
| KR | 10-2018-0029735 A | 3/2018 |
| WO | 2018/052210 A1 | 3/2018 |

OTHER PUBLICATIONS

Japanese Office Action dated Sep. 14, 2020, issued in corresponding Japanese Patent Application No. 2019-151920 (4 pages).

EPO Extended European Search Report dated Sep. 25, 2020, issued in corresponding European Patent Application No. 20193862.8 (6 pages).

Korean Office Action dated Nov. 12, 2020, issued in corresponding Korean Patent Application No. 10-2019-0103079 (9 pages).

CNIPA Office action and Search Report dated Oct. 21, 2021 in corresponding Chinese Patent Application No. 201910779012.1, 22 pages.

* cited by examiner

POSITIVE ACTIVE MATERIAL, METHOD OF MANUFACTURING THE SAME, AND POSITIVE ELECTRODE AND RECHARGEABLE LITHIUM BATTERY INCLUDING THE SAME

CROSS-REFERENCE TO RELATED APPLICATION

This application claims priority to and the benefit of Korean Patent Application No. 10-2018-0098249, filed in the Korean Intellectual Property Office on Aug. 22, 2018, the entire content of which is incorporated herein by reference.

BACKGROUND

1. Field

One or more aspects of example embodiments of the present disclosure are related to a positive active material, a method of manufacturing the same, and a positive electrode and a rechargeable lithium battery including the same.

2. Description of the Related Art

A battery transforms chemical energy, generated from electrochemical redox reactions of a chemical material in the battery, into electrical energy. A battery may be classified as a primary battery, which should be disposed of after the energy of the battery is all consumed (e.g., because the primary battery cannot be recharged), or a rechargeable battery, which may be recharged many times. The rechargeable battery may be charged/discharged many times based on reversible transformations between chemical energy and electrical energy.

Recent developments in high-tech electronics have allowed electronic devices to become small and lightweight, which has led to an increase in portable electronic devices. Batteries with high energy density are enjoying increased demand as a power source for such portable electronic devices, and research on lithium rechargeable batteries is under brisk progress.

The rechargeable lithium battery may be manufactured by injecting an electrolyte into a battery cell, which includes a positive electrode including a positive active material capable of intercalating/deintercalating lithium ions, and a negative electrode including a negative active material capable of intercalating/deintercalating lithium ions.

The positive active material includes a lithium-containing compound capable of reversibly intercalating and deintercalating lithium ions, for example, a lithium-containing composite oxide such as a lithium cobalt oxide, a lithium manganese oxide, a lithium nickel oxide, and/or the like.

As rechargeable lithium batteries become more widely used, rechargeable lithium batteries having a smaller size and/or weight along with improved efficiency and/or capacity are increasingly desired. In order to provide the rechargeable lithium battery having improved efficiency and/or capacity, positive active materials having improved density are also desired.

SUMMARY

One or more aspects of embodiments of the present disclosure are directed toward a positive active material having high density and thermal stability, and a method of manufacturing the same.

One or more aspects of embodiments of the present disclosure are directed toward a positive electrode including the positive active material.

One or more aspects of embodiments of the present disclosure are directed toward a rechargeable lithium battery with improved efficiency and cycle-life retention.

One or more example embodiments of the present disclosure provide, a positive active material including a lithium cobalt oxide including a secondary particle having an average particle diameter of about 15 µm to about 25 µm, wherein the secondary particle includes a plurality of primary particles having an average particle diameter of about 2 µm to about 10 µm, and the positive active material has a pellet density of greater than or equal to about 3.80 g/cm$^3$.

One or more example embodiments of the present disclosure provide a method of manufacturing a positive active material including heat-treating a cobalt-containing compound at a temperature of greater than or equal to about 900° C. to form a cobalt oxide including $Co_3O_4$ and CoO, and reacting the cobalt oxide with a lithium compound to form the lithium cobalt oxide according to the above embodiment of the present disclosure.

One or more example embodiments of the present disclosure provide a positive electrode including a current collector and a positive active material layer on the current collector, wherein the positive active material layer includes the aforementioned positive active material.

One or more example embodiments of the present disclosure provide a rechargeable lithium battery including the aforementioned positive electrode, a negative electrode, and an electrolyte between the positive electrode and the negative electrode.

The positive active material has a high pellet density, and may thus provide high electrode density and contribute to improved electrochemical properties (such as efficiency and cycle-life retention) in the rechargeable lithium battery.

DETAILED DESCRIPTION

Hereinafter, exemplary embodiments of the present disclosure will be described in more detail with reference to the accompanying drawings. However, in the description of the present disclosure, descriptions of functions and/or components already known in the related art may be omitted in order to clarify the gist of the present disclosure.

In the drawings, the thicknesses of layers, films, panels, regions, etc., may be exaggerated for clarity. Like reference numerals designate like elements throughout the specification, and duplicative descriptions may not be provided. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

One or more example embodiments of the present disclosure provide a positive active material including a lithium cobalt oxide. The lithium cobalt oxide includes secondary particles having an average particle diameter of about 15 μm to about 25 μm, wherein the secondary particles include a plurality of primary particles having an average particle diameter of about 2 μm to about 10 μm, and the positive active material has pellet density of greater than or equal to about 3.80 g/cm$^3$. The lithium cobalt oxide including the secondary particles including (e.g., consisting of) the agglomerated primary particles may have a relatively high density, compared with lithium cobalt oxide in the related art including (e.g., consisting of) monocrystals without the agglomerated primary particles, and may thereby exhibit excellent performance in terms of initial efficiency, rate capability, cycle-life retention, and/or thermal stability. As used herein to describe lithium cobalt oxide in the related art, the term "monocrystals" may refer to a material that does not include primary particles that agglomerate to form larger secondary particles. For example, the monocrystalline structure may only include primary particles that remain substantially separate from each other, and are not organized into larger secondary structures. In some embodiments, the term "monocrystals" may also specifically refer to a structure in which each particle is a single crystal having a continuous and unbroken crystal lattice to the edges of the particle.

As used herein, the term "average particle diameter" may refer to the particle diameter at 50 volume % in a cumulative size-distribution curve of particle diameters (D50), as measured by putting a plurality of particles in a particle size analyzer.

Figure 1:
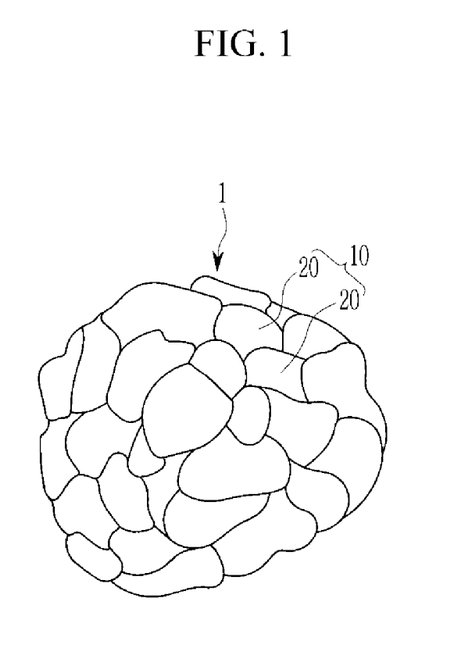
FIG. 1 is a schematic cross sectional view of a positive active material according to an embodiment of the present disclosure.

The positive active material is illustrated with reference to FIG. 1. FIG. 1 is a schematic cross sectional view of a positive active material according to an embodiment of the present disclosure. Referring to FIG. 1, a positive active material includes a secondary particle 1 having an average particle diameter of about 15 μm to about 25 μm, in which a plurality of primary particles 10 is agglomerated, each primary particle 20 having an average particle diameter of about 2 μm to about 10 μm of.

The positive active material may have a pellet density of greater than or equal to about 3.80 g/cm$^3$, for example, greater than or equal to about 3.82 g/cm$^3$. For example, the positive active material may have a pellet density of less than or equal to about 3.90 g/cm$^3$, for example, less than or equal to about 3.85 g/cm$^3$. When the positive active material has a pellet density within these ranges, electrode density may be improved. Without being bound by the correctness of any theory or explanation, it is thought that the high, improved pellet density of the positive active material is a result of the secondary particle structure and size of the positive active material according to embodiments of the present disclosure, as afforded by the preparation methods described herein, which were not available in the related art.

Since the primary particles 10 are closely stuck together, the secondary particle 1 may have an internal porosity of less than or equal to about 10%. In addition, the secondary particle 1 may have an average internal pore size (diameter) of less than or equal to about 5 nm, for example, less than or equal to about 4 nm, or less than or equal to about 3 nm. As used herein, the term "internal" may refer to a region within about 50% to about 70%, for example, about 60% of the distance from the center of each secondary particle to the outermost surface thereof, or for example, the centrally positioned remainder of the particle that is not included in an outer region that is defined to be within about 2 μm from the outermost surface of the secondary particle. As used herein, the term "internal porosity" may refer to the volume of internal pores relative to the total volume of the secondary particle 1, which volume does not include the lithium cobalt oxide or other solid material.

The ratio of the average particle diameter of the primary particle 20 to the average particle diameter of the secondary particle 1 may be greater than or equal to about 1:3, greater than or equal to about 1:4, or greater than or equal to about 1:5; and less than or equal to about 1:12, for example, less than or equal to about 1:11, less than or equal to about 1:10, less than or equal to about 1:9, less than or equal to about 1:8, or less than or equal to about 1:7. When the ratio of the average particle diameter of the primary particle 20 to the average particle diameter of the secondary particle 1 is within these ranges, the initial efficiency, rate capability, and cycle-life retention of the positive active material may be improved.

When the secondary particle is cut along its longest diameter, the resulting cross-section of the secondary particle may include greater than or equal to about eight cross sections of the primary particles. For example, cross sections of at least eight primary particles may be present along the longest cross sectional diameter of one secondary particle. When a larger number of primary particles is included, the initial efficiency, rate capability, and cycle-life retention of the material may be improved. In an embodiment, the number of primary particle cross sections may be less than or equal to about 20, for example, less than or equal to about 18, less than or equal to about 15, or less than or equal to about 12. The number of primary particle cross sections may be counted by a scanning electron microscope (SEM).

A c-axis crystal lattice constant of the lithium cobalt oxide may satisfy the following range: 14.060 Å≤c≤14.069 Å

When the c-axis lattice constant of the lithium cobalt oxide satisfies the above range, the efficiency and cycle-life retention of a rechargeable lithium battery including the lithium cobalt oxide may be further improved. Since the lithium cobalt oxide is a layered compound, as the c-axis length is increased, lithium ion activity (e.g., intercalation and deintercalation) becomes easier, and accordingly, excellent effects in terms of charge/discharge efficiency and/or cycle-life retention may be obtained.

The lithium cobalt oxide may further include at least one oxide (e.g., a metal-containing oxide) including at least one metal selected from Mn, Zn, Ti, and Co. For example, the at least one metal-containing oxide may be coated on the lithium cobalt oxide (e.g., on the surface of the secondary particle). The at least one metal-containing oxide may be provided as a plurality of island-shapes. The size of the island-shapes of the at least one metal-containing oxide may depend on the raw material of the oxide. For example, the size of the island-shapes of the oxide may be about 200 nm to about 600 nm. This oxide may be included in an amount of greater than or equal to about 0.5 parts by weight, for example, greater than or equal to about 0.6 parts by weight, greater than or equal to about 0.7 parts by weight, greater than or equal to about 0.8 parts by weight, or greater than or equal to about 1 part by weight; and less than or equal to about 5 parts by weight, for example, less than or equal to about 4 parts by weight, or less than or equal to about 3 parts by weight based on 100 parts by weight of the lithium cobalt oxide. The lithium cobalt oxide may be prepared under a first heat-treatment as described below, and may then be further mixed with the at least one metal-containing oxide and second heat-treated. For example, the second heat-treatment may be carried out under a temperature ramp up to 900° C. to 950° C. at a rate of 3° C./min to 5° C./min, after which the temperature may be maintained at 900° C. to 950° C. for about 5 hours, and then decreased down to 25° C. at a rate of 3° C./min to 5° C./min. Herein, the initial efficiency and the rate capability may be further improved.

Another embodiment of the present disclosure provides a positive active material including a first lithium cobalt oxide, and a second lithium cobalt oxide having an average particle diameter of about 2 μm to about 10 μm (which may alternatively be referred to as a small particle lithium cobalt oxide). The first lithium cobalt oxide is the aforementioned lithium cobalt oxide (and may alternatively be referred to as a large particle first lithium cobalt oxide). When the large particle first lithium cobalt oxide and the small particle second lithium cobalt oxide are mixed, the pellet density of the positive active material and an electrode density of a positive electrode including the same may be further increased.

The first lithium cobalt oxide and the second lithium cobalt oxide may be included (mixed) in a weight ratio of greater than or equal to about 6:4, for example, greater than or equal to about 7:3; and less than or equal to about 9:1, for example, less than or equal to about 8:2. Within this range, the pellet density of the positive active material and the electrode density of the positive electrode including the same may be further improved.

At least one of the first lithium cobalt oxide and the second lithium cobalt oxide may further include at least one oxide (e.g., a metal-containing oxide) including at least one metal selected from Mn, Zn, Ti, and Co. For example, the at least one metal-containing oxide may be coated on at least one surface (e.g., the surface of the secondary particle) of the first lithium cobalt oxide and the second lithium cobalt oxide. The oxide may be coated in an amount of greater than or equal to about 0.5 parts by weight, for example, greater than or equal to about 0.6 parts by weight, greater than or equal to about 0.7 parts by weight, greater than or equal to about 0.8 parts by weight, or greater than or equal to about 1 part by weight; and less than or equal to about 5 parts by weight, for example, less than or equal to about 4 parts by weight, or less than or equal to about 3 parts by weight based on 100 parts by weight of the lithium cobalt oxide. Herein, the initial efficiency and the rate capability may be further improved. The first lithium cobalt oxide and the second lithium cobalt oxide, after being mixed and first heated-treated, may then be further mixed with the at least one metal-containing oxide and second heat-treated. For example, the second heat-treatment may be the same as described above.

The lithium cobalt oxide may be produced through a reaction of cobalt oxide including CoO with a lithium compound. The cobalt oxide including CoO shows an X-ray diffraction (XRD) peak within a 2 theta range of about 40° to about 45° (degree) in analysis that corresponds to the CoO. As used herein, the term "cobalt oxide" may refer to one or more types or kinds of compounds including (e.g., consisting of) oxygen atoms, and cobalt atoms having any suitable oxidation state. Non-limiting examples of cobalt oxide include cobalt(II) oxide (CoO), cobalt (II,II) oxide ($Co_3O_4$), cobalt (III) oxide ($Co_2O_3$), and combinations thereof.

The lithium cobalt oxide may be prepared by heat-treating a cobalt-containing compound (cobalt-containing precursor) at a temperature of greater than or equal to about 900° C. to form a cobalt oxide including $Co_3O_4$ and CoO, and then reacting the cobalt oxide with the lithium compound.

The cobalt-containing compound (cobalt-containing precursor) may be $Co(OH)_2$, $CoCO_3$, or a mixture thereof. When the cobalt-containing compound is heat-treated at a temperature of greater than or equal to about 900° C., the cobalt oxide including two types of oxides, $Co_3O_4$ and CoO, is produced. When the cobalt oxide including $Co_3O_4$ and CoO is reacted with the lithium compound, a plurality of primary particles is generated due to CoO having high reactivity, and the plurality of primary particles are thus formed into the secondary particle of the lithium cobalt oxide.

The aforementioned lithium compound may include, for example, lithium phosphate ($Li_3PO_4$), lithium nitrate ($LiNO_3$), lithium acetate ($LiCH_3COOH$), lithium carbonate ($Li_2CO_3$), lithium hydroxide (LiOH), lithium dihydrogen phosphate ($LiH_2PO_4$), or any combination thereof, but embodiments of the present disclosure are not limited thereto.

The lithium compound may be included in a mole ratio of lithium relative to cobalt of about 0.8 to about 1.0. When the mole ratio of lithium relative to cobalt is within this range, the efficiency and/or cycle-life retention of a rechargeable lithium battery including the positive active material may be improved. When the cobalt-containing compound is heat-treated at a temperature of greater than or equal to about 900° C. to prepare cobalt oxide including CoO, which is reacted with the lithium compound, a positive active material having a denser structure may be prepared, compared to when the cobalt-containing compound is heat-treated at a temperature of about 850° C. to prepare cobalt oxide, which is reacted with the lithium compound.

Hereinafter, a positive electrode including the positive active material is described.

The positive electrode includes a current collector and a positive active material layer disposed on at least one surface of the current collector.

The current collector may be an aluminum foil, but embodiments of the present disclosure are not limited thereto.

The positive active material layer includes the aforementioned positive active material, a binder, and a conductive material.

The binder improves binding properties of the positive active material particles to each other and to a current collector. Non-limiting examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but embodiments of the present disclosure are not limited thereto.

The conductive material provides an electrode with conductivity (conductive characteristics). Any electrically conductive material may be used as a conductive material unless it causes an unwanted chemical change. Non-limiting examples of the conductive material include a carbon-based material such as natural graphite, artificial graphite, carbon black, acetylene black, ketjen black, a carbon fiber, and the like; a metal-based material (such as metal powder and/or metal fiber including copper, nickel, aluminum, silver, and/or the like); a conductive polymer (such as a polyphenylene derivative), or a mixture thereof.

The positive electrode may be manufactured by mixing the positive active material, the binder, and the conductive material in a solvent to prepare a positive active material slurry and coating the positive active material slurry on a current collector.

The solvent may include N-methylpyrrolidone and/or the like, but embodiments of the present disclosure are not limited thereto.

Herein, the positive electrode may have a mixture density (e.g., mixed material density) of greater than or equal to about 4.00 g/cm$^3$ or greater than or equal to about 4.03 g/cm$^3$, and less than or equal to about 4.10 g/cm$^3$ or less than or equal to about 4.05 g/cm$^3$. When the mixture density of the positive electrode is within this range, a positive electrode having excellent discharge capacity may be obtained, while problems such as lack of electrolyte solution impregnation, deterioration of high rate capability, destruction of an active material particle, breakage of a current collector during processing, and/or the like, may be prevented or reduced in advance.

The positive electrode is not limited to the arranged shapes, but may have other shapes. In some embodiments, the positive electrode may further include an additional positive active material known in the related art but having at least one different technical feature in terms of a composition, a particle diameter, and/or the like, from those of the aforementioned positive active material.

Hereafter, a rechargeable lithium battery including the aforementioned positive electrode is described.

Figure 2:
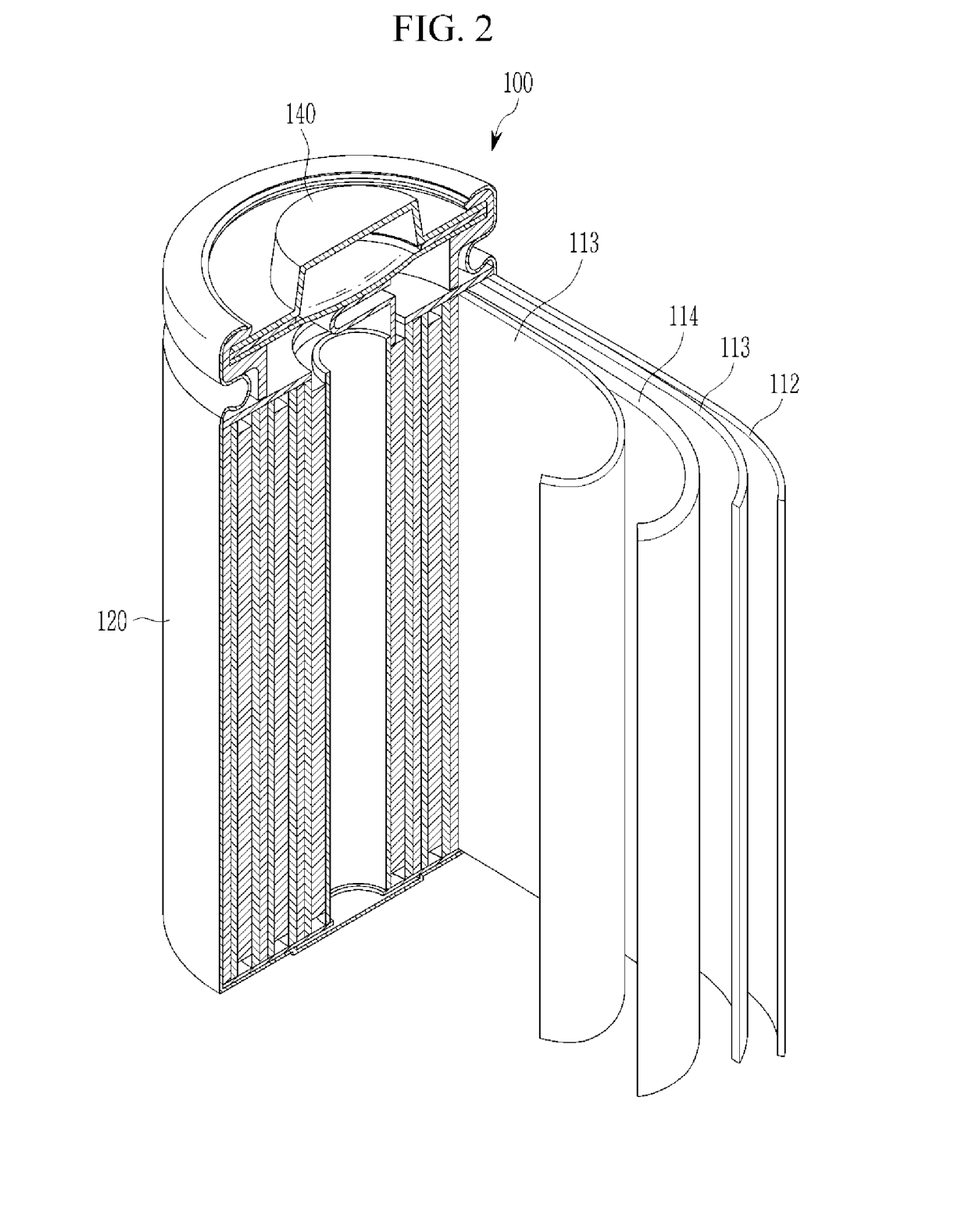
FIG. 2 is a schematic view showing an example rechargeable lithium battery according to another embodiment of the present disclosure.

FIG. 2 is a schematic view showing a rechargeable lithium battery according to another embodiment of the present disclosure. Referring to FIG. 2, a rechargeable lithium battery 100 includes a battery cell including a positive electrode 114, a negative electrode 112 facing the positive electrode 114, a separator 113 interposed between the positive electrode 114 and the negative electrode 112, an electrolyte solution impregnating the positive electrode 114, negative electrode 112, and separator 113, a battery case 120, and a sealing member 140 sealing the battery case 120.

The positive electrode 114 may be the aforementioned positive electrode.

The negative electrode 112 includes a current collector and a negative active material layer formed on at least one surface of the current collector.

The current collector may include a copper foil, a nickel foil, a stainless steel foil, a titanium foil, a nickel foam, a copper foam, a polymer substrate coated with a conductive metal, or any combination thereof.

The negative active material layer may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbon material. The carbon material may be any suitable carbon-based negative active material available for use in a rechargeable lithium battery. Non-limiting examples thereof include crystalline carbon, amorphous carbon, and mixtures thereof. The crystalline carbon may be non-shaped (e.g., carbon having no particular shape), or sheet, flake, spherical, or fiber shaped natural graphite or artificial graphite. The amorphous carbon may be a soft carbon (low temperature fired carbon), a hard carbon, a mesophase pitch carbonization product, fired coke, and/or the like.

In some embodiments, when graphite is used, there is no voltage change at the negative electrode, and accordingly, a 3 V-grade high-capacity battery may be effectively manufactured by using it with the lithium cobalt oxide-based positive active material.

The lithium metal alloy may be or include an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be Si, SiOx (0<x<2), a Si-Q alloy (wherein Q is an element selected from an alkali metal, an alkaline-earth metal, a Group 13 element, a Group 14 element excluding Si, a transition metal, a rare earth element, and combinations thereof), Sn, SnO$_2$, Sn—R alloy (wherein R is an element selected from an alkali metal, an alkaline-earth metal, a Group 13 element, a Group 14 element excluding Sn, a transition metal, a rare earth element, and combinations thereof), and/or the like. At least one of these materials may be mixed with SiO$_2$. The elements Q and R may be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), Pb, ruthenium (Ru), osmium (Os), hassium (Hs), rhodium (Rh), iridium (Ir), palladium (Pd), platinum (Pt), copper (Cu), silver (Ag), gold (Au), Zn, cadmium (Cd), boron (B), Al, gallium (Ga), Sn, In, thallium (Tl), Ge, phosphorus (P), arsenic (As), Sb, bismuth (Bi), sulfur (S), selenium (Se), tellurium (Te), polonium (Po), and combinations thereof.

The binder improves the binding properties of negative active material particles with each other and with the current collector. The binder may be or include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or any combination thereof.

When the water-soluble binder is used as a negative electrode binder, a cellulose-based compound may be additionally used as a thickener to provide viscosity. The cellulose-based compound may include one or more of carboxymethyl cellulose, hydroxypropylmethyl cellulose, methyl cellulose, or alkali metal salts thereof. The alkali metal may be Na, K, and/or Li. Such a thickener may be included in an amount of about 0.1 to about 3 parts by weight based on 100 parts by weight of the negative active material.

The conductive material may be used as a conductive material unless it causes an unwanted chemical change. Non-limiting examples of the conductive material may include a carbon-based material (such as natural graphite, artificial graphite, carbon black, acetylene black, ketjen black, a carbon fiber, and/or the like); a metal-based material of a metal powder and/or a metal fiber including copper, nickel, aluminum silver, and/or the like; a conductive polymer (such as a polyphenylene derivative); and mixtures thereof.

The negative electrode may be manufactured by mixing a negative active material, a binder, and optionally a conductive material in a solvent to prepare a negative active material slurry, and coating the negative active material slurry on a current collector, followed by drying and compressing. The solvent may be N-methylpyrrolidone, but embodiments of the present disclosure are not limited thereto. Suitable methods of manufacturing the negative electrode are available in the related art and are not described in detail in the present specification.

The electrolyte may include a non-aqueous organic solvent and a lithium salt.

The non-aqueous organic solvent may serve as a medium for transmitting ions involved in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like, and the ketone-based solvent may include cyclohexanone, and/or the like. The alcohol-based solvent may include ethanol, isopropyl alcohol, and/or the like, and the aprotic solvent may include nitriles (such as R—CN, where R is a C2 to C20 linear, branched, or cyclic hydrocarbon group and may include a double bond, aromatic ring, and/or ether bond) and/or the like, amides (such as dimethylformamide), dioxolanes (such as 1,3-dioxolane), sulfolanes, and/or the like.

The non-aqueous organic solvent may be used alone (e.g., as a single solvent) or in a mixture. When the organic solvent is used in a mixture, a mixing ratio may be controlled in accordance with a desirable battery performance.

The lithium salt dissolved in the organic solvent supplies a battery with lithium ions for basic operation of the rechargeable lithium battery, and facilitates transportation of the lithium ions between a positive electrode and a negative electrode. Non-limiting examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer of 1 to 20), LiCl, LiI, and $LiB(C_2O_4)_2$ (lithium bis(oxalato) borate, LiBOB), and combinations thereof. A concentration of the lithium salt may be about 0.1 M to about 2.0 M. When the lithium salt is included at the above concentration range, the electrolyte may have excellent performance and lithium ion mobility due to optimal electrolyte conductivity and viscosity.

The separator 113 separates the positive electrode 114 and the negative electrode 112 while providing transporting passages for lithium ions, and may be any suitable separator for a lithium ion battery. The separator may have low resistance to ion transport and/or excellent impregnation by the electrolyte. For example, the separator may be formed of a material selected from a glass fiber, polyester, Teflon, polyethylene, polypropylene, polytetrafluoroethylene (PTFE), and combinations thereof. The separator may have the form of a non-woven fabric or a woven fabric. For example, in a lithium ion battery, a polyolefin-based polymer separator (such as polyethylene and/or polypropylene) may be used. In some embodiments, a coated separator including a ceramic component or a polymer material may be used to provide heat resistance and/or mechanical strength. The separator may have a mono-layered structure or a multi-layered structure.

Rechargeable lithium batteries may be classified as lithium ion batteries, lithium ion polymer batteries, or lithium polymer batteries according to the presence and kind of separator, and the kind of electrolyte used therein. The rechargeable lithium battery according to embodiments of the present disclosure may have any suitable shape and size. For example, the rechargeable lithium battery may be a cylindrical, prismatic, coin, or pouch-type battery, and may be a thin film battery, or may be rather bulky in size. Suitable structures and manufacturing methods for lithium ion batteries pertaining to this disclosure are available in the related art.

Hereinafter, the above aspects of the present disclosure are illustrated in more detail with reference to examples. However, these examples are exemplary, and embodiments of the present disclosure are not limited thereto.

Example 1: Preparation of Positive Active Material

Cobalt oxide ($Co_3O_4$) including CoO was prepared by heat-treating $CoCO_3$ under a temperature ramp up to 900° C. at a rate of 5° C./min, after which the temperature was maintained at 900° C. for 5 hours, and then decreased down to 25° C. at a rate of 5° C./min.

The cobalt oxide was mixed with lithium carbonate ($Li_2CO_3$) to prepare a mixture having a mole ratio of Li:Co=1:1.

The mixture was heat-treated under a temperature ramp up to 1050° C. at a rate of 5° C./min, after which the temperature was maintained at 1050° C. for 5 hours, and decreased down to 25° C. at a rate of 5° C./min to prepare a $LiCoO_2$ positive active material including secondary particles, each secondary particle including a plurality of primary particles. The obtained $LiCoO_2$ secondary particles had an average particle diameter of 20 μm, and the primary particles had an average particle diameter of 3 μm.

Example 2: Preparation of Positive Active Material $LiCoO_2$ (small particle lithium cobalt oxide) having an average particle diameter of 5 μm was prepared by heat-treating lithium carbonate and cobalt oxide having an average particle diameter of 4 μm in a mole ratio of 0.97:1 at 1050° C.

LiCoO$_2$ (large particle lithium cobalt oxide) according to Example 1 and the obtained LiCoO$_2$ (small particle lithium cobalt oxide) were mixed in a weight ratio of 8:2 to prepare a positive active material.

Example 3: Preparation of Positive Active Material

LiCoO$_2$ (small particle lithium cobalt oxide) having an average particle diameter of 5 μm was prepared by heat-treating lithium carbonate and cobalt oxide having an average particle diameter of 4 μm in a mole ratio of 0.97:1 at 1050° C.

LiCoO$_2$ (large particle lithium cobalt oxide) according to Example 1 and the obtained LiCoO$_2$ (small particle lithium cobalt oxide) were mixed in a weight ratio of 8:2, and then heat-treated with TiO$_2$ at 950° C. to prepare a positive active material. The TiO$_2$ was used in an amount of 1 part by weight based on 100 parts by weight of the lithium cobalt oxides.

Comparative Example 1: Preparation of Positive Active Material

Lithium hydroxide NOM and Co(OH)$_2$ were mixed in a mole ratio of 1:1 mole ratio to prepare a mixture.

The mixture was heat-treated under a temperature ramp up to 400° C. at a rate of 5° C./min, after which the temperature was maintained at 400° C. for 5 hours, and decreased down to 25° C. at a rate of 5° C./min. The mixture was subsequently re-mixed, uniformly dispersed, and then secondarily heat-treated at 750° C. for 12 hours using the same increasing and decreasing temperature rates as above to prepare a LiCoO$_2$ positive active material including a plurality of primary particles. The obtained LiCoO$_2$ primary particles had an average particle diameter of 1 μm, and the secondary particles had an average particle diameter of 10 μm.

Example 4: Manufacture of Rechargeable Lithium Battery Cell 96 wt % of the positive active material according to Example 1, 2 wt % of ketjen black, and 2 wt % of polyvinylidene fluoride were mixed in N-methyl pyrrolidone as a solvent to prepare positive active material slurry. The positive active material slurry was coated on an Al foil, followed by drying and compressing the same, to manufacture a positive electrode. The positive electrode, a lithium metal counter electrode, and an electrolyte were used to manufacture a half-cell. The electrolyte was prepared by dissolving 1.0M LiPF$_6$ in a mixed solvent of ethylene carbonate and dimethyl carbonate (a volume ratio of 1:1).

Examples 5 and 6: Manufacture of Rechargeable Lithium Battery Cells

Half-cells according to Examples 5 and 6 were manufactured using the positive active materials according to Examples 2 and 3, respectively, instead of the positive active material according to Example 1.

Comparative Example 2: Manufacture of Rechargeable Lithium Battery Cell

A half-cell according to Comparative Example 2 was manufactured using the positive active material according to Comparative Example 1 instead of the positive active material according to Example 1.

Figure 3:
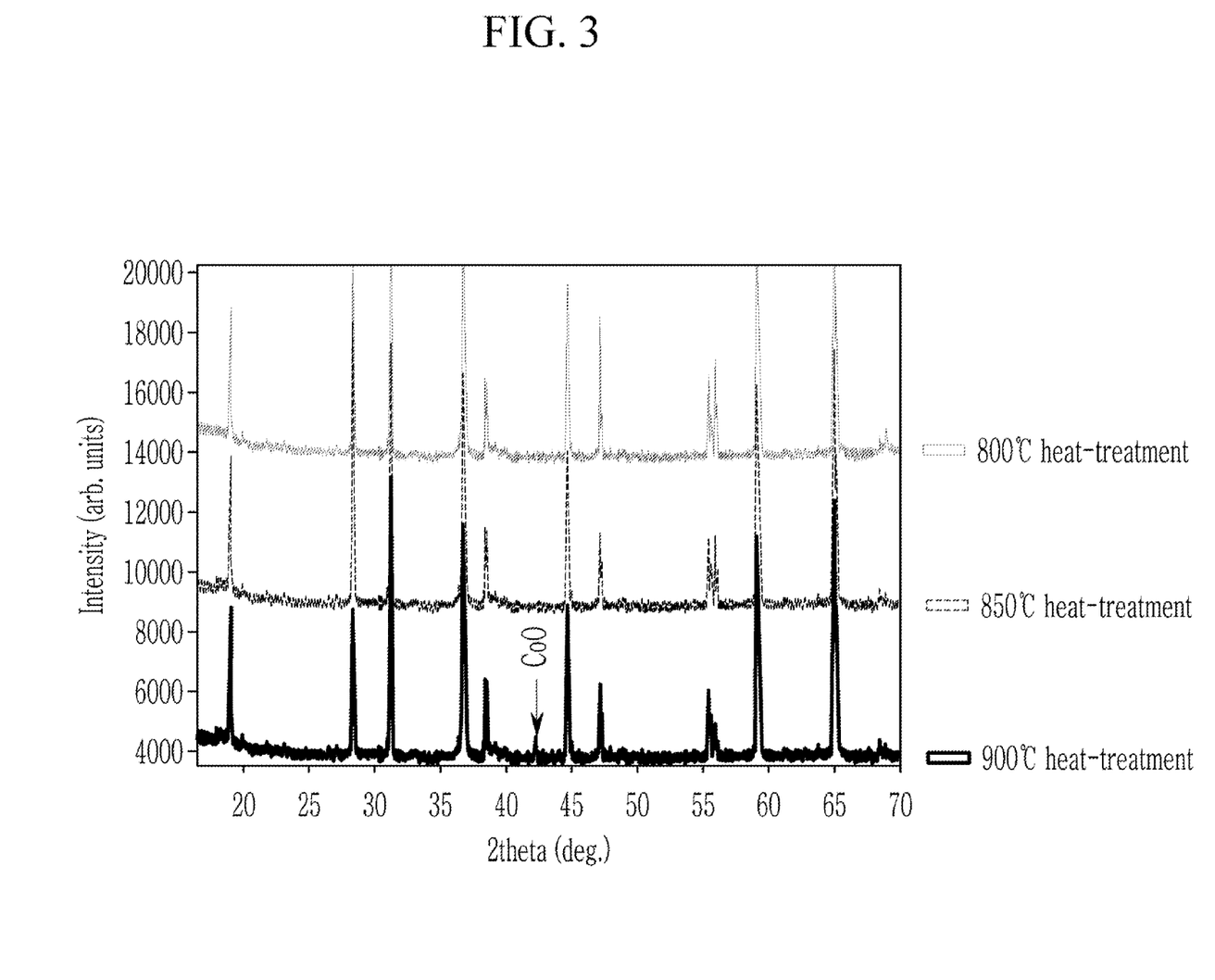
FIG. 3 is a graph showing the X-ray diffraction (XRD) results of cobalt oxides produced during heat-treatments at about 800° C., about 850° C., and about 900° C., respectively.

Evaluation Example 1: X-Ray Diffraction Analysis of Cobalt Oxide Depending on Heat-Treatment Temperature Cobalt oxides obtained by heat-treating CoCO$_3$ at 800° C., 850° C., and 900° C. were analyzed by X-ray diffraction (XRD). CuKα was used as a radiation source, and the analysis was performed between $10°≤2θ≤80°$ at scan rate of 1°/min. The results are shown in FIG. 3. Referring to FIG. 3, only the cobalt oxide heat-treated at 900° C. (e.g., at a temperature greater than or equal to 900° C.) exhibited an X-ray diffraction peak corresponding to cobalt oxide having a CoO structure and stoichiometry.

Evaluation Example 2: X-Ray Diffraction Pattern Analysis of Positive Active Material X-ray diffraction patterns of the positive active materials according to Example 1 and Comparative Example 1 were measured using CuKα radiation, and the measured lattice constants are shown in Table 1.

TABLE 1

|  | a (Å) | c (Å) | c/a |
|---|---|---|---|
| Example 1 | 2.816 (5) | 14.063 (3) | 4.995 |
| Comparative Example 1 | 2.817 (5) | 14.058 (6) | 4.990 |

The numbers inside the parenthesis in Table 1 denote the standard deviation. As shown in Table 1, the c-axis lattice constant of the positive active material according to Example 1 is larger than that of the positive active material according to Comparative Example 1.

Evaluation Example 3: Pellet Density of Positive Active Material

The pellet densities of the positive active materials according to Examples 1 and 3 and Comparative Example 1 were evaluated. The pellet density was measured and recorded using 3.0000 g (within an error range±0.0004 g) of each positive active material. The positive active material was pressed with a 4-ton presser for 30 seconds using a 13 mm-sized KBr pellet die, and the resulting height decrease was measured to calculate a weight per a volume. The results for the positive active materials according to Examples 1 and 3 and Comparative Example 1 are shown in Table 2.

Evaluation Example 4: Mixture Density of Positive Electrode

The mixture densities of the positive active materials according to Examples 1 to 3 and Comparative Example 1 were evaluated. The mixture density was measured by mixing 97 wt % of each positive active material, 1.5 wt % of ketjen black, and 1.5 wt % of a binder in N-methyl pyrrolidone solvent to prepare a positive active material slurry, coating the positive active material slurry on an Al foil (as a substrate), drying it, and pressing each at the same pressure to obtain the mixture density under a general pressure and a maximum mixture density reflecting a substrate stress. The results for the positive active materials according to Examples 1 and 3 and Comparative Example 1 are shown in Table 2.

TABLE 2

| Sample | Pellet density (g/cm³) | Mixture density (g/cm³) |
|---|---|---|
| Example 1 | 3.80 | 4.03 |
| Example 3 | 3.84 | 4.10 |
| Comparative Example 1 | 3.77 | 3.98 |

Referring to Table 2, the pellet densities of the positive active materials according to Examples 1 and 3 and the mixture densities of positive electrodes respectively including the same were improved compared with the positive active material according to Comparative Example 1.

Evaluation Example 5: Thermal Stability of Positive Active Material

Figure 4:
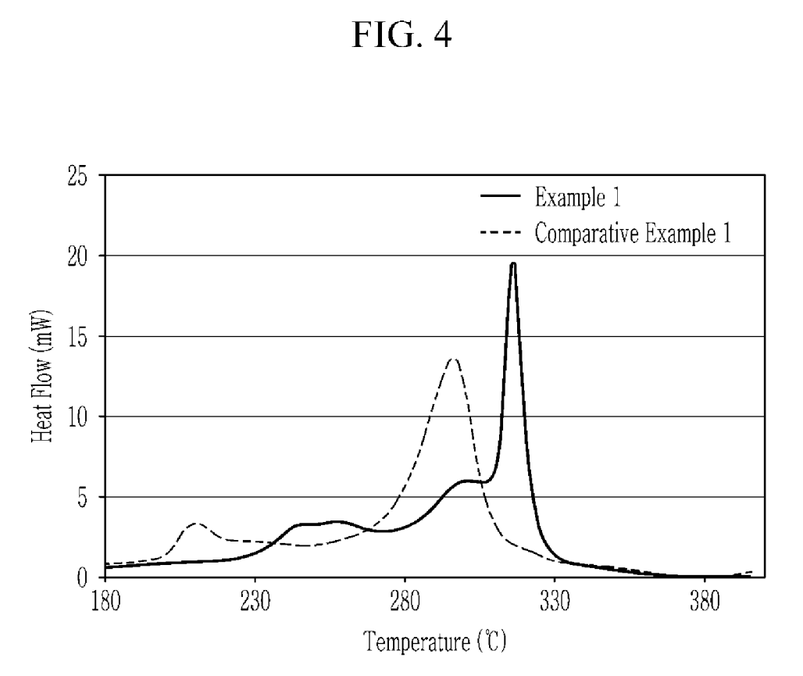
FIG. 4 is a graph showing differential scanning calorimetry (DSC) evaluation results of the positive active materials according to Example 1 and Comparative Example 1.

The thermal stabilities of the positive active materials according to Example 1 and Comparative Example 1 were evaluated. The half-cells according to Examples 4 to 6 and Comparative Example 2, respectively including the positive active materials according to Example 1 and Comparative Example 1, were charged at 0.1 C up to 4.5 V, disassembled to recover the positive active materials, and the thermal stability thereof was then evaluated using Differential Scanning calorimetry (DSC). The DSC evaluation results of the positive active materials according to Example 1 and Comparative Example 1 are shown in Table 3 and FIG. 4. FIG. 4 is a graph showing the Differential Scanning calorimetry (DSC) evaluation results of the positive active materials according to Example 1 and Comparative Example 1.

TABLE 3

| | Onset (° C.) | Max. temp. (° C.) | Total J (J/g) |
|---|---|---|---|
| Example 1 | 220 | 316 | 2353 |
| Comparative Example 1 | 190 | 302 | 2575 |

Referring to Table 3 and FIG. 4, the positive active material according to Example 1 exhibited a higher onset temperature and a higher maximum exothermic temperature compared to the positive active material according to Comparative Example 1. Accordingly, the positive active material according to Example 1 exhibited excellent thermal stability compared with that of the positive active material according to Comparative Example 1.

Evaluation Example 6: Electrochemical Characteristics of Rechargeable Lithium Battery The half-cells according to Examples 4 to 6 and Comparative Example 2 were charged and discharged once at 0.1 C, and the initial charge and discharge efficiencies thereof were evaluated. The half-cells were charged and discharged once more at 0.1 C, charged at 0.1 C to a cut-off of 4.5 V, charged under constant voltage with a cut-off current of 0.05 C, and then discharged at 1.0 C with a cut-off of 3.0 V to measure the 1 C discharge capacity. The ratio 1 C discharge capacity/0.1 C discharge capacity was used to evaluate the rate capability of each half-cell. The half-cells were charged under a constant current at 1.0 C (1.0 C=160 mAh/g) with a cut-off of 4.5 V, and then charged under a constant voltage condition with a cut-off at 0.05 C and then, discharged at 1.0 C with a cut-off of 3.0 V at room temperature (25° C.), and this charge and discharge was repeated 50 times to evaluate cycle-life retention. The results are shown in Table 4.

TABLE 4

| | Initial capacity (0.1 C, mAh/g) | Initial efficiency (0.1 C, %) | Rate capability (1 C/0.1 C) | Cycle-life retention (50 cycles) |
|---|---|---|---|---|
| Example 4 | 199.62 | 97.02 | 92.66% | 91.95% |
| Example 5 | 198.52 | 96.83 | 93.14% | 92.66% |
| Example 6 | 199.98 | 97.23 | 93.47% | 92.87% |
| Comparative Example 2 | 197.75 | 96.50 | 91.80% | 90.30% |

Referring to Table 4, the rechargeable lithium battery cells according to Examples 4 to 6 exhibited excellent performance in terms of rate capability and cycle-life retention as well as initial capacity and initial efficiency compared with those of the rechargeable lithium battery cell according to Comparative Example 2.

As used herein, the terms "use", "using", and "used" may be considered synonymous with the terms "utilize", "utilizing", and "utilized", respectively. As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinbefore, the certain embodiments of the present disclosure have been described and illustrated, however, it will be apparent to a person with ordinary skill in the art that the present disclosure is not limited to the embodiment as described, and may be variously modified and transformed without departing from the spirit and scope of the present disclosure. Accordingly, the modified or transformed embodiments as such may not be understood separately from the technical ideas and aspects of the present disclosure, and the modified embodiments are within the scope of the claims of the present disclosure and equivalents thereof.

DESCRIPTION OF SOME OF THE SYMBOLS

1: secondary particle
10: a plurality of primary particles
100: rechargeable lithium battery
113: separator
120: battery case
20: primary particle
112: negative electrode
114: positive electrode
140: sealing member

What is claimed is:

1. A positive active material for a rechargeable lithium battery, the positive active material comprising:
a lithium cobalt oxide comprising a secondary particle having an average particle diameter of about 15 μm to about 25 μm,
wherein the secondary particle comprises a plurality of primary particles having an average particle diameter of about 2 μm to about 10 μm, and the positive active material has a pellet density of greater than or equal to about 3.80 g/cm$^3$, and
wherein a c-axis lattice constant of the lithium cobalt oxide satisfies the following range: 14.060 Å≤c≤14.069 Å.

2. The positive active material of claim 1, wherein the positive active material has pellet density of about 3.80 g/cm$^3$ to about 3.85 g/cm$^3$.

3. The positive active material of claim 1, wherein the secondary particle has an internal porosity of less than or equal to about 10%.

4. The positive active material of claim 1, wherein the secondary particle has internal pores having an average diameter of less than or equal to about 5 nm.

5. The positive active material of claim 1, wherein a ratio of the average particle diameter of the primary particle to the average particle diameter of the secondary particle is about 1:3 to about 1:12.

6. The positive active material of claim 1, wherein at least about 8 cross sections of primary particles from among the plurality of primary particles are present along the longest cross sectional diameter of the secondary particle.

7. The positive active material of claim 1, wherein the lithium cobalt oxide comprises a metal-containing oxide comprising at least one metal selected from Mn, Zn, Ti, and Co.

8. The positive active material of claim 1, wherein the positive active material further comprises another lithium cobalt oxide having an average particle diameter of about 2 μm to about 10 μm.

9. The positive active material of claim 8, wherein the lithium cobalt oxide and the other lithium cobalt oxide are present in a weight ratio of about 6:4 to about 9:1.

10. The positive active material of claim 8, wherein at least one of the lithium cobalt oxide and the other lithium cobalt oxide comprises a metal-containing oxide comprising at least one metal selected from Mn, Zn, Ti, and Co.

11. A positive electrode for a rechargeable lithium battery, comprising:
a current collector; and
a positive active material layer on the current collector,
wherein the positive active material layer comprises the positive active material of claim 1.

12. The positive electrode of claim 11, wherein the positive electrode has an electrode density of greater than or equal to about 4 g/cm$^3$.

13. A rechargeable lithium battery comprising:
the positive electrode according to claim 11;
a negative electrode; and
an electrolyte with the positive electrode and the negative electrode.

14. A method of manufacturing a positive active material, the method comprising:
heat-treating a cobalt-containing compound at a temperature of greater than or equal to about 900° C. to form a cobalt oxide comprising $Co_3O_4$ and CoO,
adding a lithium compound, and
reacting the cobalt oxide with the lithium compound to prepare the lithium cobalt oxide,
wherein the positive active material comprises the lithium cobalt oxide comprising:
a secondary particle having an average particle diameter of about 15 μm to about 25 μm,
wherein the secondary particle comprises a plurality of primary particles having an average particle diameter of about 2 μm to about 10 μm, and
wherein the positive active material has a pellet density of greater than or equal to about 3.80 g/cm$^3$.

15. The method of claim 14, wherein the lithium compound is added so that a mole ratio of lithium relative to cobalt is about 0.8 to about 1.0.

16. The method of claim 14, wherein a c-axis lattice constant of the lithium cobalt oxide satisfies the following range: 14.060 Å≤c≤14.069 Å.

17. A positive electrode for a rechargeable lithium battery, comprising:
a current collector; and
a positive active material layer on the current collector,
wherein the positive active material layer comprises the positive active material manufactured by the method of claim 16.

* * * * *

UNITED STATES PATENT AND TRADEMARK OFFICE
CERTIFICATE OF CORRECTION

PATENT NO. : 11,271,202 B2
APPLICATION NO. : 16/547422
DATED : March 8, 2022
INVENTOR(S) : Soonkie Hong et al.

It is certified that error appears in the above-identified patent and that said Letters Patent is hereby corrected as shown below:

In the Claims
Column 16, Line 23, Claim 14    Delete "the",
                                Insert --a--

Signed and Sealed this
Twenty-third Day of May, 2023

Katherine Kelly Vidal
*Director of the United States Patent and Trademark Office*